3,634,587
METHOD OF IMMUNIZING CATTLE AGAINST BOVINE RESPIRATORY DISEASE SYNDROME
Roland W. Ament and Joseph F. England, Overland Park, Kans., assignors to Ralston Purina Company, St. Louis, Mo.
No Drawing. Filed Nov. 6, 1969, Ser. No. 874,701
Int. Cl. C12k 5/00
U.S. Cl. 424—89        11 Claims

ABSTRACT OF THE DISCLOSURE

A method of enhancing the immunity of cattle to Respiratory Disease Syndrome has been developed which employs an intramuscularly administered quadrivalent vaccine containing three modified live viral components: Infectious Bovine Rhinotracheitis (IBR), Bovine Viral Diarrhea Mucosal Disease (BVD-MD), and Parainfluenza-3 (PI–3) which is reconstituted with a diluent containing a Pasteurella bacterin and simultaneously administered with an intranasal bivalent vaccine containing Parainfluenza-3 (PI–3) virus and a Pasteurella bacterin.

BACKGROUND OF THE INVENTION

This invention relates to a method of immunizing cattle against Bovine Respiratory Disease Syndrome.

Bovine Respiratory Disease Syndrome is commonly known as "shipping fever" and is of major economic significance to the cattle industry. Of the approximately 30 million cattle being placed on feed each year in the United States, it is estimated that from 30 to 40% have some type of Respiratory Disease Syndrome. The disease is most common in commercial cattle feedlots and occurs primarily during the first few weeks after arrival of cattle in a feedlot. The disease is associated with numerous causative factors, to include environmental stresses placed on the animal at the time of transfer from a ranch to a feedlot, as well as nutritional conditions existing during the transfer. Various viral agents and certain microorganisms have been identified as the ultimate causative factors in Bovine Respiratory Disease Syndrome, and for this reason biological products are needed to insure adequate protection against the Respiratory Disease Syndrome and minimize economic losses associated with shipment and exposure of cattle during shipment. The significance of a number of viral agents in the Respiratory Disease Syndrome, such as Infectious Bovine Rhinotracheitis (IBR), Bovine Viral Diarrhea Mucosal Disease (BVD-MD) and Parainfluenza-3 (PI–3), has been established and they have been identified as being among the viral agents primarily responsible for Bovine Respiratory Disease Syndrome. Often bacterial infections are secondary invaders in an animal afflicted with a viral respiratory infection, and for this reason Bovine Respiratory Disease Syndrome is generally a result of both viral and bacterial infection, which is in turn potentiated by stresses placed on the animal during shipment to a feedlot. Among the bacterial agents which serve as a secondary invaders in an animal afflicted with a viral infection are strains of *Pasteurella multocida* as well as *Pasteurella hemolytica*. Although mortality of animals afflicted with a Respiratory Disease Syndrome may vary from only 1 to 10%, a much more severe economic loss generally results from morbidity associated with the Respiratory Disease Syndrome, as evidenced by reduced feed consumption, a loss of weight, and a decrease in general health and well being of the animal. With viral and bacterial infections being the primary causative factors in the Respiratory Disease Syndrome, a new concept of immunization is needed to provide improved immunological protection against these agents during shipment of the animals and during the first few weeks upon arrival at a commercial feedlot. It is well-known in the art to immunize against viral infections by the use of a modified live virus vaccine which stimulates the in vivo production of antibodies to fight the disease organisms when they are introduced in the body. Individual viral agent immunization by means of separate injections of a single modified live virus against the three main viral agents associated with Bovine Respiratory Disease Syndrome is also well-known in the art. Furthermore, the use of bacterins to stimulate the production of antibodies effective against secondary bacterial infections in the Respiratory Disease Syndrome is also well-known, and among the bacterins used are those containing Pasteurella strains. A major disadvantage of these techniques as known to the art, however, lies in the inconvenience of making multiple injections to provide immunity against more than one infectious agent, and it would therefore be of great advantage to introduce as many agents in a single injection as possible, since it offers convenience and economy to the user of a biological product in immunizing a large herd of cattle. For this reason it is preferable to combine in the form of a combination vaccine as many of the modified live virus components and bacterins as possible to provide immunity with a single injection. The primary limiting factor on combination vaccines of this type, however, is that the individual components be completely compatible with one another and not decrease the effectiveness of any component in the mixture. Although generally the use of two or more modified live viral components together, such as the IBR, PI–3 and BVD-MD viruses, do not exhibit incompatibility, the use of a bacterin in direct combination with a live virus is normally not possible. This is because of the presence of a killing agent such as formaldehyde or other chemical such as Beta-propiolactone, which is used to destroy the bacterial agent and which cannot be efficiently removed. The presence of this killing agent will in turn inactivate the live viral components should it come in contact with it, particularly if in contact with it for an extended period of time. For this reason, a combination vaccine containing both live viral and bacterial component has necessitated the use of inactivated viral components to overcome this problem, although a disadvantage of the use of inactivated viral components is a reduction in immunological response of the animal. Another means of overcoming this problem of incompatibility between live viral components and bacterins is to store the bacterin in the diluent for the viral components and reconstitute the viral components, which are normally freeze dried, with the diluent containing the bacterin just before injection. The viral and bacterial components are sufficiently compatible for a limited period of time to allow injection of a large herd of cattle without a loss in effectiveness of the live viral agents. This allows live viral components and a bacterin to be administered in a single injection.

SUMMARY OF THE INVENTION

This technique was employed in the present invention to allow intramuscular immunization against three viral and two bacterial components with a single injection. The combination of these components is defined within the scope of this invention as a quadrivalent vaccine. Although the single intramuscular injection of the three viral and two bacterial components provides good immunity against the Respiratory Disease Syndrome, it has been found that an enhanced immunity against the Respiratory Disease Syndrome can be attained by employing simultaneously with the single administration of a quadrivalent vaccine, a single administration of a bivalent vaccine intranasally in the animal to provide local protection, which contains both PI-3 virus and *Pasteurella hemolytica* and *multocida* strains.

It is therefore the principal object of this invention to provide a method of enhancing immunization against Bovine Respiratory Disease Syndrome by the simultaneous administration of a quadrivalent vaccine containing four components—three viral and one bacterial mixture intramuscularly—and a bivalent vaccine containing two components—one viral component and one bacterial mixture—as the second component. The simultaneous administration of the two vaccines provides a means of enhancing immunity of the animal against the Respiratory Syndrome over the singular use of either the bivalent intranasal vaccine or the quadrivalent intramuscular vaccine.

It is a further object of this invention to provide a means of immuinzing cattle against the Respiratory Disease Syndrome which is of maximum convenience to the user of the vaccine.

It is a further object of this invention to provide an improved means of reducing the incidence of the Respiratory Disease Syndrome in cattle both during shipment to a commercial feedlot as well as increase the animal's feed consumption, general health and well being during the feeding period by prevention of the Respiratory Disease Syndrome.

These and other objects of this invention will be apparent to those skilled in the art.

DESCRIPTION OF THE PREFERRED EMBODIMENTS

The preferred components of the intramuscular quadrivalent vaccine are the three modified live viral components associated with the disease which include Infectious Bovine Rhinotracheitis (IBR), Bovene Viral Diarrhea Mucosal Disease (BVD-MD), and Parainfluenza-3 (PI–3). The viral components for the quadrivalent vaccine are produced by well-known techniques in porcine kidney tissue culture cells and harvested from the culture cells. The components are combined by volume to yield a total viral batch of 16,000 ml. of the total, 2,000 ml. of IBR, 2,000 ml. of PI–3 and 8,000 ml. of BVD-MD viral agents were used and to this was added 4,000 ml. of stabilizer such as phosphate buffer. The mixture was then freeze dried and stored in a suitable container of twenty-five dosage units. Typical production and batching of the three viral components as used in the quadrivalent vaccine are set forth in Table I.

TABLE I.—IBR-BVD-PI-3-PASTEURELLA QUADRIVALENT VACCINE

| | IBR | BVD | PI–3 |
|---|---|---|---|
| 1. Viral harvest: | | | |
| Titer | $10^{7.2}$/ml | $10^{5.9}$/ml | $10^{7.2}$/ml. |
| Brucella | Negative | Negative | Negative. |
| Adventitious agents test | do | do | Do. |
| Sterility | do | do | Do. |
| 2. Batching (viral components): | | | |
| Lot 1: | | | |
| IBR | | | 2,000 ml. |
| BVD | | | 8,000 ml. |
| PI–3 | | | 2,000 ml. |
| Total virus | | | 12,000 ml. |
| Stabilizer | | | 4,000 ml. |
| Total batch | | | 16,000 ml. |
| Size | | | 25 dose. |
| 3. Final product testing: | | | |
| Sterility | | | Satisfactory. |
| Safety | | | Do. |
| Titer: | | | |
| IBR | | | $10^{5.68}$/2 ml. dose. |
| BVD | | | $10^{5.5}$/2 ml. dose. |
| PI–3 | | | $10^{6.5}$/2 ml. dose. |

A Pasteurella bacterin with both *Pasteurella hemolytica* and *multocida* strains is prepared according to Table II and a colloidal suspension of the bacterin is prepared in Aluminum Hydroxide Gel and stored in a separate container and used as the diluent for reconstitution of the three freeze dried viral components.

TABLE II.—PASTEURELLA BACTERIN

| | *P. Hemolytica* | *P. Multocida* |
|---|---|---|
| 1. Preparation: | | |
| Lot Number | 1 | 1. |
| Medium | Dextrose starch agar. | Dextrose starch agar. |
| Number plates | 10 | 10. |
| Volume of harvest | 1,000 ml | 1,000 ml. |
| Plate count $10^9$ dil | 4 colonies | 4 colonies. |
| Dilution factor | 4 | 4. |
| Diluent | Saline | Saline. |
| Total volume | 4,000 ml. | 4,000 ml. |
| Sterility | Satisfactory | Satisfactory. |
| 2. Batching: | | |
| Volume *P. Hemolytica*, ml | | 4.000 |
| Volume *P. Multocida*, ml | | 4,000 |
| Volume 5N KOH, ml | | 120 |
| Volume 10% Beta-propiolactone, ml | | 240 |
| 2% Al. hydroxide Gel, ml | | 420 |
| 1% phenol red, ml | | 8 |
| Merthiolate 1:10,000, ml | | 9 |
| Total batch, ml | | 8,797 |
| Final sterility | | Satisfactory. |

The preferred components of the bivalent intranasal vaccine is a Parainfluenza-3 virus and a Pasteurella bacterin with both *Pasteurella hemolytica* and *multocida* strains that is prepared according to Table III and stored in a suitable container of twenty-five dosage units for intranasal administration.

TABLE III.—PI–3 PASTEURELLA BIVALENT VACCINE

1. PI–3 virus.
Virus: Same PI–3 viral fluids as set forth in Table I.
Titer: $10^{7.4}$ ml.

| | *P. Multocida* | *P. Hemolytica* |
|---|---|---|
| 2. Pasteurella bacterin: | | |
| A. Preparation: | | |
| Lot Number | 3A | 3A. |
| Medium | Dextose starch agar. | Dextrose starch agar. |
| Number plates | 3 | 3. |
| Volume harvested | 300 ml | 300 ml. |
| Plate count $10^9$ dil | 4 Colonies | 4 colonies. |
| Dilution factor | 8 | 8. |
| Diluent | Saline | Saline. |
| Total volume | 2,400 ml | 2,400 ml. |
| Sterility | Satisfactory | Satisfactory. |
| B. Batching (9/16/68): | | |
| Volume *P. Hemolytica* | | 2,000 ml. |
| Volume *P. Multocida* | | 2,000 ml. |
| Volume 5N KOH | | 60 ml. |
| Volume 10% beta-propiolactone | | 120 ml. |
| Volume 1% phenol red | | 4 ml. |
| Total volume | | 4,184 ml. |
| Sterility | | Satisfactory. |
| 3. Product Batching: | | |
| PI–3 Lot 3A | | 4,000 ml. |
| Pasteurella bacterin | | 4,000 ml. |
| Total Batch | | 8,000 ml. |
| Bottling | | |
| Size | | 25 dose. |
| 4. Final Product Testing: | | |
| Sterility | | Satisfactory. |
| Animal testing (mice and guinea pigs) | | Do. |

The amount of the viral and bacterial components may be varied within a range which would be readily apparent to one skilled in the art and Tables I, II, and III list the preferred amounts of these components necessary to yield a titer value of not less than $10^{4.7}TCID_{50}\pm0.5$ log per cattle dose ($TCID_{50}$ Tissue Culture infective $dose_{50}$) for Parainfluenza-3 virus, a titer value of not less than $10^{4.5}$ $TCID_{50}\pm0.5$ log per cattle dose for Bovine Viral Diarrhea Mucosal Disease, and a titer value of not less than $10^{4.2}$ $TCID_{50}\pm0.5$ log per cattle dose for Infectious Bovine Rhinotracheitis. The number of Pasteurella organisms is not critical, but it is preferable they are added in sufficient quantity to give a total Pasteurella organism count of at least $2.5\times10^8$ organisms per milliliter.

The preferred method of administration of the quadrivalent vaccine after reconstitution in the diluent containing the bacterin is injection with a sterile needle of a typical cattle dose of 2.0 ml. The bivalent intranasal vaccine is administered using an individual plastic cannula into each nostril of the animal with its head held in a high position so little of the vaccine will be expired. The amount of the intranasal vaccine which would be employed is a typical cattle dose of 2.0 ml., although this may be varied, depending on the animal.

In accordance with the embodiments of this invention, two experimental serials of quadrivalent modified live virus Pasteurella bacterin vaccine and two serials of a bivalent Parainfluenza-3 Pasteurella vaccine were tested in 136 calves approximately two to three months of age. Each calf was considered to be in a healthy condition and on a high efficiency ration prior to initiation of these studies. The calves selected, furthermore, had no prior history of vaccination or incidence of disease. In all calves vaccinated, dosages comprised injection of 2.0 ml. in the gluteal muscle of the calf of the reconstituted quadrivalent vaccine and insertion of 2.0 ml. of the bivalent vaccine in each nostril of the calf. The total group of 136 calves were divided into eight groups and treated as follows:

Group 1.—Twenty calves vaccinated intranasally with the bivalent vaccine and intramuscularly with the quadrivalent vaccine., Group 2.—10 calves vaccinated intramuscularly with the quadrivalent vaccine only.

Group 3.—10 calves vaccinated intranasally with the bivalent vaccine only.

Group 4.—10 calves with no vaccination employed as controls for Groups 1, 2 and 3.

Group 5.—Twenty calves receiving both the quadrivalent vaccine intramuscularly and the bivalent vaccine intranasally.

Group 6.—10 calves receiving no vaccination and employed as controls.

Group 7.—20 calves receiving no vaccination and penned next to the vaccinated calves to determine virus shedding following vaccination of the other groups.

Group 8.—38 calves receiving no vaccination and held in a separate part of the test area apart from the other seven test groups to use for comparison of weight gains and general health as compared to the other seven groups.

Twenty-one days following vaccination of the calves, Groups 1 through 4 were challenged intranasally with virulent Parainfluenza-3 virus to simulate the introduction of the Respiratory Disease Syndrome. Prior to vaccination and at the time of vaccination, as well as at the time of challenge, serum samples were collected to determine PI-3 antibody level. Approximately 50% of the calves had been determined to be negative for PI-3 antibodies at the time of vaccination. Temperatures and white blood cell counts were also performed on each animal every other day for 14 days following challenge with the PI-3 virus. In addition, nasal specimens were collected from the calves every other day for two weeks following challenge to determine PI-3 virus excretion, the presence of the PI-3 virus during the two to ten-day period following challenge being used as an indication of a slowness of antibody production and, thus, a lack of protection against PI-3 infection.

Twenty-one days following vaccination, the calves in the vaccinated group showed a significant antibody response when tested against the PI-3 virus. Using virus excretion in nasal specimens during the two to ten-day period after challenge as indicative of lack of protection, the calves vaccinated with both the intranasal bivalent and intramuscular quadrivalent vaccine were 80% protected against PI-3 infection, as shown in Table IV, as compared to 50% protection in the calves in Group 2 receiving the intramuscular quadrivalent vaccine only, as shown in Table IV, and 60% protection in calves in Group 3 inoculated intranasally with the bivalent vaccine only, as shown in Table IV. The virus excretion pattern in the ten control calves in Group 4 following challenge indicated only 20% protection, as shown in Table IV.

TABLE IV.—SUMMARY OF VIRUS ISOLATIONS FROM CALVES IN GROUPS 1 THROUGH 4 CHALLENGED INTRANASALLY WITH VIRULENT PI-3 VIRUS

| | Number with virus excretion 2-10 days after challenge | Number with no virus excretion 2-10 days after challenge | Percent protection |
|---|---|---|---|
| Group 1 | 4 | 16 | 80 |
| Group 2 | 5 | 5 | 50 |
| Group 3 | 4 | 6 | 60 |
| Group 4 | 8 | 2 | 20 |

It is thus apparent from the data that the quadrivalent intramuscular vaccine gave significant protection to cattle challenged with a live virus and that the intranasal bivalent vaccine also exhibited significant protection. While both of these techniques singularly increased immunity against Respiratory Disease Syndrome by a factor of 2.5 and 3, respectively, it is also apparent from the data that the combination of the two techniques enhanced immunity against Respiratory Disease Syndrome by a factor of 4 times, thus providing almost complete immunity against the syndrome with a minimum number of injections and convenience to the user. This technique also does not require any subsequent injections to increase immunity and provide protection to cattle during shipment to a feedlot operation and during the critical feeding period.

Serum antibody responses in the vaccinated and control calves in Groups 1 through 4 closely paralleled virus excretion patterns, as shown in Tables V, VI, VII and VIII.

TABLE V.—SERUM NEUTRALIZING ANTIBODY RESPONSE IN 20 CALVES IN GROUP 1 VACCINATED INTRANASALLY WITH BIVALENT PI-3-PASTEURELLA VACCINE AND QUADRIVALENT IBR-BVD-PI-3-PASTEURELLA VACCINE INTRAMUSCULARLY AND FOLLOWING SUBSEQUENT INTRANASAL CHALLENGE WITH VIRULENT PI-3 VIRUS

| | PI-3 serum neutralizing antibody | | |
|---|---|---|---|
| | Pre-vaccination | 21 days post-vaccination | 14 days post-challenge |
| Animal No. (Group 1): | | | |
| A1 | [1]2 | [1]16 | [1]16 |
| A2 | 2 | 32 | 256 |
| A3 | 2 | 8 | 8 |
| A4 | 2 | 16 | 16 |
| A5 | 2 | 4 | 8 |
| A6 | 2 | 32 | 32 |
| A7 | 2 | 128 | 128 |
| A8 | 4 | 8 | 64 |
| A9 | 4 | 16 | 16 |
| A10 | 16 | 16 | 16 |
| A11 | 4 | 8 | 32 |
| A12 | 2 | 64 | 64 |
| A13 | 16 | 32 | 32 |
| A14 | 2 | 32 | 16 |
| A15 | 2 | 64 | 64 |
| A16 | 2 | 8 | 16 |
| A17 | 2 | 128 | 128 |
| A18 | 2 | 16 | 16 |
| A19 | 2 | 16 | 8 |
| A20 | 8 | 16 | 128 |

[1] PI-3 serum neutralizing antibody expressed as reciprocal of final serum dilution.

TABLE VI.—PARAINFLUENZA-3 SERUM NEUTRALIZING ANTIBODY RESPONSE IN 10 CALVES IN GROUP 2 VACCINATED INTRAMUSCULARLY WITH QUADRIVALENT IBR-BVD-PI-3-PASTEURELLA VACCINE AND CHALLENGED INTRANASALLY WITH VIRULENT PI-3 VIRUS

| | PI-3 serum neutralizing antibody | | |
|---|---|---|---|
| | Pre-vaccination | 21 days post-vaccination | 14 days post-challenge |
| Animal No. (Group 2): | | | |
| C1 | [1]4 | [1]8 | [1]8 |
| C2 | 2 | 32 | 128 |
| C3 | 4 | 16 | 16 |
| C4 | 2 | 32 | 64 |
| C5 | 2 | 16 | 64 |
| C6 | 2 | 128 | 156 |
| C7 | 2 | 4 | 32 |
| C8 | 2 | 4 | 32 |
| C9 | 8 | 64 | 64 |
| C10 | 2 | 64 | 64 |

[1] PI-3 serum neutralizing antibody expressed as reciprocal of final serum dilution.

TABLE VII.—PARAINFLUENZA-3 SERUM NEUTRALIZING ANTIBODY RESPONSE IN 10 CALVES IN GROUP 3 VACCINATED INTRANASALLY WITH BIVALENT PI-3 PASTEURELLA VACCINE AND CHALLENGED INTRANASALLY WITH VIRULENT PI-3 VIRUS

|  | PI-3 serum neutralizing antibody | | |
|---|---|---|---|
|  | Pre-vaccination | 21 days post-vaccination | 14 days post-challenge |
| Animal No. (Group 3): | | | |
| C11 | [1] 16 | [1] 32 | [1] 128 |
| C12 | 2 | 4 | 64 |
| C13 | 2 | 16 | 32 |
| C14 | 2 | 2 | 2 |
| C15 | 2 | 8 | 16 |
| C16 | 2 | 4 | 4 |
| C17 | 2 | 64 | 64 |
| C18 | 8 | 16 | 64 |
| C19 | 4 | 16 | 8 |
| C20 | 2 | 8 | 8 |

[1] PI-3 serum neutralizing antibody titers expressed as reciprocal of final serum dilution.

TABLE VIII.—PARAINFLUENZA-3 SERUM NEUTRALIZING ANTIBODY RESPONSE IN 10 CALVES IN GROUP 4 WHICH SERVED AS CONTROLS FOR VACCINATED GROUPS 1, 2 AND 3 CHALLENGED INTRANASALLY WITH VIRULENT PI-3 VIRUS

|  | PI-3 serum neutralizing antibody | | |
|---|---|---|---|
|  | Pre-vaccination | 21 days post-vaccination | 14 days post-challenge |
| Animal No. Controls Group 4: | | | |
| 01 | [1] 2 | [1] 4 | [1] 32 |
| 02 | 2 | 2 | 128 |
| 03 | 2 | 2 | 2 |
| 04 | 2 | 2 | 64 |
| 05 | 2 | 2 | 64 |
| 06 | 2 | 2 | 16 |
| 07 | 2 | 2 | 32 |
| 08 | 2 | 2 | 16 |
| 09 | 2 | 2 | 16 |
| 010 | 2 | 2 | 8 |

[1] PI-3 serum neutralizing antibody titer expressed as reciprocal of final serum dilution.

Group 4 antibody responses as listed in Table VIII shows no PI-3 antibody response 21 days following vaccination, while those in Groups 1 through 3 show a significant PI-3 antibody buildup, with those in Group 1, which received both the bivalent intranasal product and intramuscular product, having a higher and more consistent PI-3 antibody production, as listed in Table V.

No significant deviation from the normal in temperatures or white blood counts were observed in either the vaccinated or control groups of 1 through 4 following virulent PI-3 virus challenge. The only clinical symptoms observed in Groups 1 through 4 were a slight nasal discharge which was more pronounced in the control group than Groups 1 through 3. The calves in Groups 5 and 6 were then challenged with a combination of the three viral agents, as well as with Pasteurella organisms 21 days following vaccination. Following challenge no significant deviation from normal in temperature or white blood count was observed in the calves in Group 5, whereas the calves in Group 6 had leukocytosis and showed signs of respiratory distress. Four of the ten controls in Group 6 became very severe and died. Five of the calves of Group 5 were tested for serum antibody response for PI-3, IBR and BVD-MD 14 days after challenge, as well as 21 days after vaccination at the time of challenge, and showed a significant antibody level of these three components.

TABLE IX.—IBR, BVD SERUM ANTIBODY RESPONSE IN CALVES IN GROUP 5 VACCINATED INTRANASALLY WITH BIVALENT PI-3 PASTEURELLA VACCINE AND INTRAMUSCULARLY WITH QUADRIVALENT IBR-BVD-PI-3-PASTEURELLA VACCINE AND SUBSEQUENTLY CHALLENGED SIMULTANEOUSLY WITH VIRULENT IBR-BVD-PI-3 VIRUS AND PASTEURELLA STRAINS

|  | IBR serology | | |
|---|---|---|---|
|  | Pre-vaccination | 21 days post-vaccination | 14 days post-challenge |
| Animal No. (Group 5): | | | |
| B11 | [1] 2 | [1] 4 | [1] 16 |
| B12 | 2 | 8 | 32 |
| B13 | 2 | 4 | 32 |
| B1 | 2 | 16 | 64 |
| B2 | 2 | 2 | 16 |
| B14 | 2 | 32 | 256 |
| B15 | 2 | 64 | 128 |
| B3 | 2 | 16 | 128 |
| B4 | 2 | 64 | 256 |
| B5 | 2 | 128 | 512 |

[1] Titers expressed as reciprocal of final serum dilution.

TABLE X.—PI-3 AND PASTEURELLA SERUM ANTIBODY RESPONSE IN CALVES IN GROUP 5 VACCINATED INTRANASALLY WITH BIVALENT PI-3 PASTEURELLA VACCINE AND INTRAMUSCULARLY WITH QUADRIVALENT IBR-BVD-PI-3-PASTEURELLA VACCINE AND SUBSEQUENTLY CHALLENGED SIMULTANEOUSLY WITH VIRULENT IBR-BVD-PI-3 VIRUS AND PASTEURELLA STRAINS

|  | PI-3 serology | | |
|---|---|---|---|
|  | Pre-vaccination | 21 days Post-vaccination | 14 days post-challenge |
| Animal No. (Group 5): | | | |
| B16 | [1] 2 | [1] 32 | [1] 32 |
| B17 | 2 | 4 | 16 |
| B18 | 2 | 16 | 128 |
| B6 | 2 | 64 | 256 |
| B7 | 4 | 8 | 32 |

[1] Titers expressed as reciprocal of final serum dilution.

TABLE XI.—IBR, BVD AND PI-3 SERUM NEUTRALIZING ANTIBODY RESPONSE IN 10 CALVES IN GROUP 6 SERVING AS CONTROLS FOR VACCINATED CALVES IN GROUP 5 AND CHALLENGED SIMULTANEOUSLY WITH VIRULENT IBR, BVD AND PI-3 VIRUSES AND PASTEURELLA STRAINS INTRANASALLY

|  | Serum neutralizing antibodies | | | | | |
|---|---|---|---|---|---|---|
|  | Pre-challenge | | | 14 days post-challenge | | |
|  | IBR | BVD | PI-3 | IBR | BVD | PI-3 |
| Animal No. (Group 6 controls): | | | | | | |
| 011 | [1] 2 | [1] 4 | [1] 2 | ([2]) | ([2]) | ([2]) |
| 012 | 2 | 2 | 2 | [1] 8 | [1] 32 | [1] 64 |
| 013 | 2 | 2 | 2 | 32 | 32 | 16 |
| 014 | 4 | 2 | 16 | ([2]) | ([2]) | ([2]) |
| 015 | 2 | 2 | 4 | 4 | 16 | 128 |
| 016 | 2 | 2 | 2 | 16 | 64 | 64 |
| 017 | 2 | 2 | 2 | 16 | 128 | 32 |
| 018 | 2 | 2 | 2 | 32 | 8 | 32 |
| 019 | 2 | 2 | 2 | ([2]) | ([2]) | ([2]) |
| 020 | 2 | 2 | 2 | ([2]) | ([2]) | ([2]) |

[1] Titers expressed as reciprocal of final serum dilution.
[2] Died.

Control Group 6, as shown in Table XI, shows an antibody response for the three viral components on the six animals surviving challenge with the combination. The IBR, BVD and PI-3 Serology of Group 5, as shown in Tables IX and X, show a high antibody level for the three components following vaccination and challenge, without any loss in well being of the animal or severe infection that occurred with those animals in Group 6.

In addition, serum from calves in Group 5 was injected in mice to test Pasteurella antibody production in the serum, and the mice receiving the serum were then challenged with Pasteurella organisms. The mouse survival test indicated significant response to the Pasteurella fractions in the vaccine 21 days after vaccination and 14 days after challenge, as shown by survival of the challenged mice. Few mice survived the challenge when pre-vaccination serum was used, although there was at least 80% survival when post-vaccination serum was used. This is listed in Table XII.

TABLE XII.—SURVIVAL OF MICE INJECTED WITH SERUM OF CALVES IN GROUP 5 AND CHALLENGED WITH PASTEURELLA ORGANISMS

|  | Pasteurella | | |
| --- | --- | --- | --- |
|  | Pre-vaccination | 21 days post-vaccination | 14 days post-challenge |
| Animal No. (Group 5): | | | |
| B20 | [1] 1/5 | [1] 4/5 | [1] 4/5 |
| B21 | 1/5 | 4/5 | 4/5 |
| B8 | 1/5 | 4/5 | 4/5 |
| B9 | 2/5 | 4/5 | 4/5 |
| B10 | 0/5 | 5/5 | 4/5 |

[1] Survival of mice.

Of the calves in Group 7 which served only as contact controls and which were not challenged, five of the twenty calves appeared ill with the Respiratory Syndrome six to nine days after challenge of the remaining calves. These animals were treated and returned to normal in approximately two weeks.

Five of the calves in Group 8 which were kept apart in a separate test area and not vacinnated or challenged to observe the difference in vaccinated and non-vacinnated calves became involved with the Respiratory Disease Syndrome and were treated. In general, the vaccinated calves in Group 6 appeared considerably more healthy and were gaining weight to a greater degree than control calves in Group 8 in this study.

It may be seen from the foregoing that the invention accomplishes at least all of its stated objectives and this method of immunizing cattle against the Respiratory Disease Syndrome has been shown to be both a safe and effective method of providing immunization against the Bovine Respiratory Disease Syndrome.

Some changes may be made in the details or method of my invention without departing from the spirit and purpose of it and it is intended to cover by the claims any modifications or equivalents which may be included within their scope.

I claim:

1. A method of immunizing cattle against Bovine Respiratory Disease Syndrome comprising; simultaneously administering a quadrivalent Bovine Respiratory Disease Syndrome vaccine therefore containing at least one, modified, live, freeze dried virus component, intramuscularly, and a bivalent Bovine Respiratory Disease Syndrome vaccine therefore containing at least one, modified live, freeze dried virus component intranasally, by insertion into at least one nostril of the animal, each of said vaccines being administered just after reconstitution with a pasteurella bacterin diluent, said bacterin diluent containing a killing agent which adversely inactivates the live virus component when in contact therewith for an extended period of time, each of said live virus components being sufficiently compatible, however, for a limited period of time to allow injection of a large herd of cattle without a loss in effectiveness of said component, when said vaccines are reconstituted just before injection with the adversely inactivating pasteurella bacterin diluent.

2. A method of immunizing cattle against Bovine Respiratory Disease Syndrome as set forth in claim 1 wherein the modified, live, freeze dried quadrivalent vaccine comprises a viral component mixture of Infectious Bovine Rhinotracheitis Virus, Bovine Viral Diarrhea Mucosal Disease Virus, and Bovine Parainfluenza-3 Virus.

3. A method of immunizing cattle as set forth in claim 1 wherein said Pasteurella bacterin comprises a mixture of strains of *Pasteurella multocida* and *Pasteurella hemolytica*.

4. A method of immunizing cattle against Bovine Respiratory Disease Syndrome as set forth in claim 3 wherein the mixture comprises equal portions of *Pasteurella multocida* and *Pasteurella hemolytica*.

5. A method of immunizing cattle against Bovine Respiratory Disease Snydrome as set forth in claim 2 wherein said viral component mixture comprises sufficient Parainfluenza-3 Virus to yield a titer value of not less than about $10^{4.7}$ $TCID_{50} \pm 0.5$ log per cattle dose, sufficient Bovine Viral Diarrhea Mucosal Disease Virus to yield a titer value of not less than about $10^{4.5}$ $TCID_{50} \pm 0.5$ log per cattle dose, and sufficient Infectious Bovine Rhinotrachetitis Virus to yield a titer value of not less than about $10^{4.2}$ $TCID_{50} \pm 0.5$ log per cattle dose.

6. A method of immunizing cattle against Bovine Respiratory disease Snydrome as set forth in claim 1 wherein said bivalent vaccine comprises a reconstituted mixture of a modified, live, freeze dried Parainfluenza-3, viral component, said vaccine being reconstituted just prior to use with a Pasteurella bacterin diluent.

7. A method of immunizing cattle against Bovine Respiratory Disease Snydrome as set forth in claim 6 wherein the bacteria comprises a mixture of equal portions of strains of *Pasteurella hemolytica* and *Pasteurella multocida*.

8. A method of immunizing cattle against Bovine Respiratory Disease Snydrome as set forth in claim 6 wherein the mixture comprises sufficient Parainfluenza-3 Virus to yield a titer value of not less than $10^{4.7}$ $TCID_{50} \pm 0.5$ log per cattle dose.

9. A method of immunizing cattle against Bovine Respiratory Disease Snydrome comprising; administering intranasally, by insertion into at least one nostril of the animal a bivalent Bovine Respiratory Disease Syndrome vaccine therefore containing at least one modified, live, freeze dried viral component, said vaccine being administered just after reconstitution with a Pasteurella bacterin diluent, said bacterin diluent containing a killing agent which adversely inactivates the live virus component when in contact therewith for an extended period of time, said live virus component being sufficiently compatible, however, for a limited period of time to allow injection of a large herd of cattle without a loss in effectiveness of said component, when said vaccine is reconstituted just before injection with the adversely inactivating, Pasteurella bacterin, diluent.

10. A method of immunizing cattle against Bovine Respiratory Disease Snydrome as set forth in claim 9 wherein the viral component is a modified, live, freeze dried Parainfluenza-3 virus.

11. A method of immunizing cattle against Bovine Respiratory Disease Snydrome as set forth in claim 9 wherein said Pasteurella vaccine comprises a mixture of equal portions of strains of *Pasteurella multocida* and *Pasteurella hemolytica*.

References Cited

UNITED STATES PATENTS 3,425,696   9/1970   Gale et al. _____ 424—89

SHEP K. ROSE, Primary Examiner

U.S. Cl. X.R.

424—92

UNITED STATES PATENT OFFICE
CERTIFICATE OF CORRECTION

Patent No. 3,634,587        Dated January 11, 1972

Inventor(s)  Roland W. Ament and Joseph F. England

It is certified that error appears in the above-identified patent and that said Letters Patent are hereby corrected as shown below:

Column 1, Line 55 for "east" should read -- ease--;
Column 3, Line 35 for "bovene", should read -- bovine --;
Column 9, Line 24 for "vacinnated" should read -- vaccinated --;
Column 10, Line 27 for "bacteria" should read -- bacterin --;
Column 9, Lines 44 and 47, Column 10, Line 39 delete the word "therefore".

Signed and sealed this 27th day of June 1972.

(SEAL)
Attest:

EDWARD M. FLETCHER, JR.
Attesting Officer

ROBERT GOTTSCHALK
Commissioner of Patents